United States Patent

Meier et al.

[11] Patent Number: 5,914,995
[45] Date of Patent: Jun. 22, 1999

[54] NUCLEAR REACTOR FUEL ASSEMBLY

[75] Inventors: Werner Meier, Kunreuth; Peter Rau, Leutenbach, both of Germany

[73] Assignee: Siemens Aktiengesellschaft, Munich, Germany

[21] Appl. No.: 08/607,816

[22] Filed: Feb. 27, 1996

Related U.S. Application Data

[63] Continuation of application No. 08/314,960, Sep. 29, 1994, abandoned, which is a continuation of application No. 07/997,896, Dec. 29, 1992, abandoned.

[30] Foreign Application Priority Data

Jan. 3, 1992 [DE] Germany .............................. 92100065

[51] Int. Cl.⁶ ...................................................... G21C 3/32
[52] U.S. Cl. ........................... 376/444; 376/446; 376/327
[58] Field of Search .................................... 376/435, 444, 376/446, 440, 463, 233, 327

[56] References Cited

U.S. PATENT DOCUMENTS

| | | | |
|---|---|---|---|
| 3,828,868 | 8/1974 | Jabsen ...................................... | 376/446 |
| 3,953,287 | 4/1976 | Long et al. .............................. | 376/446 |
| 4,381,283 | 4/1983 | Walton .................................... | 376/327 |
| 4,382,711 | 5/1983 | Lafosse et al. .......................... | 376/233 |
| 4,492,668 | 1/1985 | Pilgrim, Jr. et al. .................... | 376/440 |
| 4,499,047 | 2/1985 | Borrmann et al. ...................... | 376/440 |
| 4,587,093 | 5/1986 | Borrmann et al. ...................... | 376/444 |
| 4,655,990 | 4/1987 | Leclerq .................................... | 376/446 |
| 4,781,885 | 11/1988 | Lill et al. ................................. | 376/444 |
| 4,818,473 | 4/1989 | Lui .......................................... | 376/446 |
| 5,141,711 | 8/1992 | Gjertsen et al. ......................... | 376/327 |
| 5,327,471 | 7/1994 | Meier et al. ............................. | 376/444 |

FOREIGN PATENT DOCUMENTS

| | | |
|---|---|---|
| 0054827 | 12/1980 | European Pat. Off. . |
| 0099323 | 6/1984 | European Pat. Off. . |
| 0224728 | 6/1987 | European Pat. Off. . |
| 3533317 | 3/1987 | Germany . |
| 91/13441 | 9/1991 | WIPO . |

*Primary Examiner*—Harvey E. Behrend
*Attorney, Agent, or Firm*—Herbert L. Lerner; Laurence A. Greenberg

[57] ABSTRACT

A nuclear reactor fuel assembly includes a fuel assembly base, a fuel assembly head and mutually parallel fuel rods containing nuclear fuel and extending between the fuel assembly head and the fuel assembly base. A water tube having first and second open ends extends parallel to the fuel rods. The first end of the water tube grips and is held at the fuel assembly base. An elongated extension body has first and second ends. The second end of the extension body grips and is held at the fuel assembly head. The second end of the water tube is screwed into the first end of the elongated extension body, or the first end of the elongated extension body is screwed into the second end of the water tube. The elongated extension body has two mutually coaxially disposed partial bodies. One of the partial bodies has the second end of the extension body and the other of the partial bodies has the first end of the extension body. One of the partial bodies is screwed into the other of the partial bodies. A check nut may be seated on the one partial body which is screwed into the other partial body and the check nut is braced against the other partial body.

11 Claims, 5 Drawing Sheets

NUCLEAR REACTOR FUEL ASSEMBLY

CROSS-REFERENCE TO RELATED APPLICATION

This application is a continuation, of application Ser. No. 08/314,960, filed Sep. 29,1994, now abandoned which is a continuation application of Ser. No. 07/997,896, filed Dec. 29, 1992, now abandoned.

BACKGROUND OF THE INVENTION

1. Field of the Invention

The invention relates to a nuclear reactor fuel assembly having a fuel assembly base, a fuel assembly head, nuclear fuel-containing fuel rods extending parallel to each other and being disposed between the fuel assembly head and the fuel assembly base, a water tube being open at both ends, extending parallel to the fuel rods, gripping and being held at the fuel assembly base at one end and having an elongated extension body at the other end, either a first end of the extension body being screwed into the water tube or the water tube being screwed into the first end of the extension body, and a second end of the extension body gripping and being held at the fuel assembly head.

2. Description of the Related Art

One such nuclear reactor fuel assembly is known from published international application No. W091/13441, corresponding to U.S. application Ser. No. 07/924,056, filed Aug. 28, 1992. The water tube of that known nuclear reactor fuel assembly has one end being screwed into the base of the fuel assembly. Two elongated extension bodies, which are parallel to each other, have first ends being screwed into the other end of the water tube and second ends extending into the fuel assembly head, and they are each screwed to the fuel assembly head with a nut.

When handling the two nuts under remote control, it may be important for the start of the thread on the second ends of the extension bodies to assume a preset position. As a rule, assuming such a preset position does no occur automatically, because the production of rotationally oriented threads at both ends of the elongated extension bodies is only possible with great effort. A tolerance range for the alignment of the thread at the first end of the two extension bodies also results when the elongated extension bodies in the water tube are tightened, even if the thread in the water tube were rotationally oriented with respect to the threads at the two ends of the extension body which is screwed into it.

It is accordingly an object of the invention to provide a nuclear reactor fuel assembly, which overcomes the hereinafore-mentioned disadvantages of the heretofore-known devices of this general type and which enables rotationally oriented fastening of the second end of an elongated extension body on the fuel assembly head with comparatively small effort.

With the foregoing and other objects in view there is provided, in accordance with the invention, a nuclear reactor fuel assembly, comprising a fuel assembly base; a fuel assembly head; mutually parallel fuel rods containing nuclear fuel and extending between the fuel assembly head and the fuel assembly base; a water tube having first and second open ends and extending parallel to the fuel rods, the first end of the water tube gripping and being held at the fuel assembly base; an elongated extension body having first and second ends, the second end of the extension body gripping and being held at the fuel assembly head; the second end of the water tube being screwed into the first end of the elongated extension body or the first end of the elongated extension body being screwed into the second end of the water tube; the elongated extension body having two mutually coaxially disposed partial bodies, one of the partial bodies having the second end of the extension body gripping the fuel assembly head and the other of the partial bodies having the first end of the extension body being screwed to the water tube, one of the partial bodies being screwed into the other of the partial bodies.

In an alternative embodiment, a check nut is seated on the one partial body being screwed into the other partial body. The check nut is braced against the other partial body.

The two partial bodies of the elongated extension body can be twisted with respect to each other until the second end of the elongated extension body has the position required for rotationally oriented fastening on the fuel assembly head, which can subsequently be fixed free of play by bracing the check nut against the other partial body.

In accordance with another feature of the invention, the first end of the water tube is screwed into the fuel assembly base.

In accordance with a further feature of the invention, the second end of the extension body extends loosely through the fuel assembly head and the fuel assembly head is fixed on the second end of the extension body by a bayonet connection.

In accordance with an added feature of the invention, there is provided a hollow weld with which the check nut is welded to the one partial body on which the check nut is seated.

In accordance with an additional feature of the invention, the check nut and the one partial body have associated threads being disposed at a distance from the hollow weld.

In accordance with a concomitant feature of the invention, the check nut is welded to the partial body against which the check nut is braced with a lip or V-weld.

Other features which are considered as characteristic for the invention are set forth in the appended claims.

Although the invention is illustrated and described herein as embodied in a nuclear reactor fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
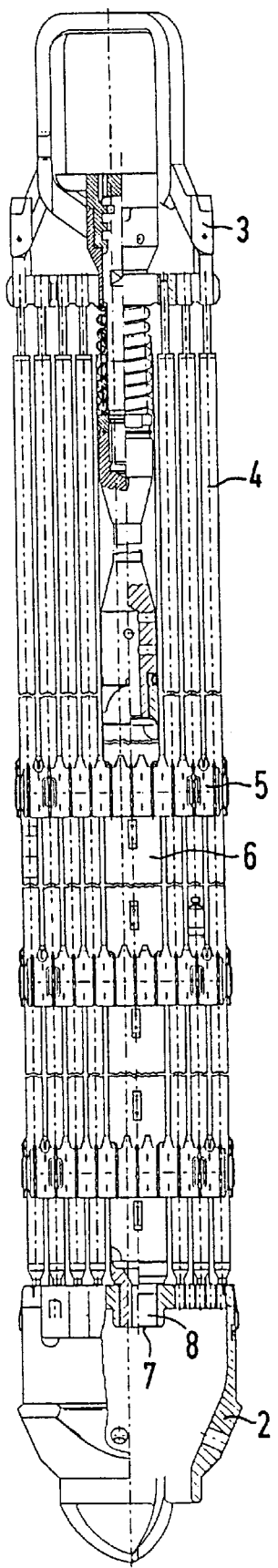
FIG. 1 is a diagrammatic, side-elevational and partially longitudinal-sectional view of a nuclear reactor fuel assembly according to the invention, which is intended for a boiling water reactor.

Referring now to the figures of the drawing in detail and first, particularly, to FIG. 1 thereof, there is seen a nuclear reactor fuel assembly having a fuel assembly base 2 and a fuel assembly head 3, between which fuel rods 4 are disposed parallel to each other. These fuel rods 4 contain nuclear fuel in a jacket tube which is closed in gas-tight fashion at both ends. Each fuel rod 4 has one end extending loosely through a lead-through in the fuel assembly head 3 and another end resting loosely on the fuel assembly base 2. Each fuel rod 4 is fed through a respective opening in a plurality of grid-shaped spacers 5, which are also spaced apart from and located next to each other, as viewed in the longitudinal direction of the nuclear reactor fuel assembly.

The fuel assembly base 2 and the fuel assembly head 3 each have a square profile, and a water tube 6 having a square cross section is disposed in the center of this square profile. Each of the two mutually parallel sides of this square cross section are parallel to two mutually parallel sides of the square profile of the fuel assembly base 2 and the fuel assembly head 3.

The water tube 6 has a first open lower end 7 with which the water tube is screwed into a lead-through 8 in the fuel assembly base 2.

Figure 2:
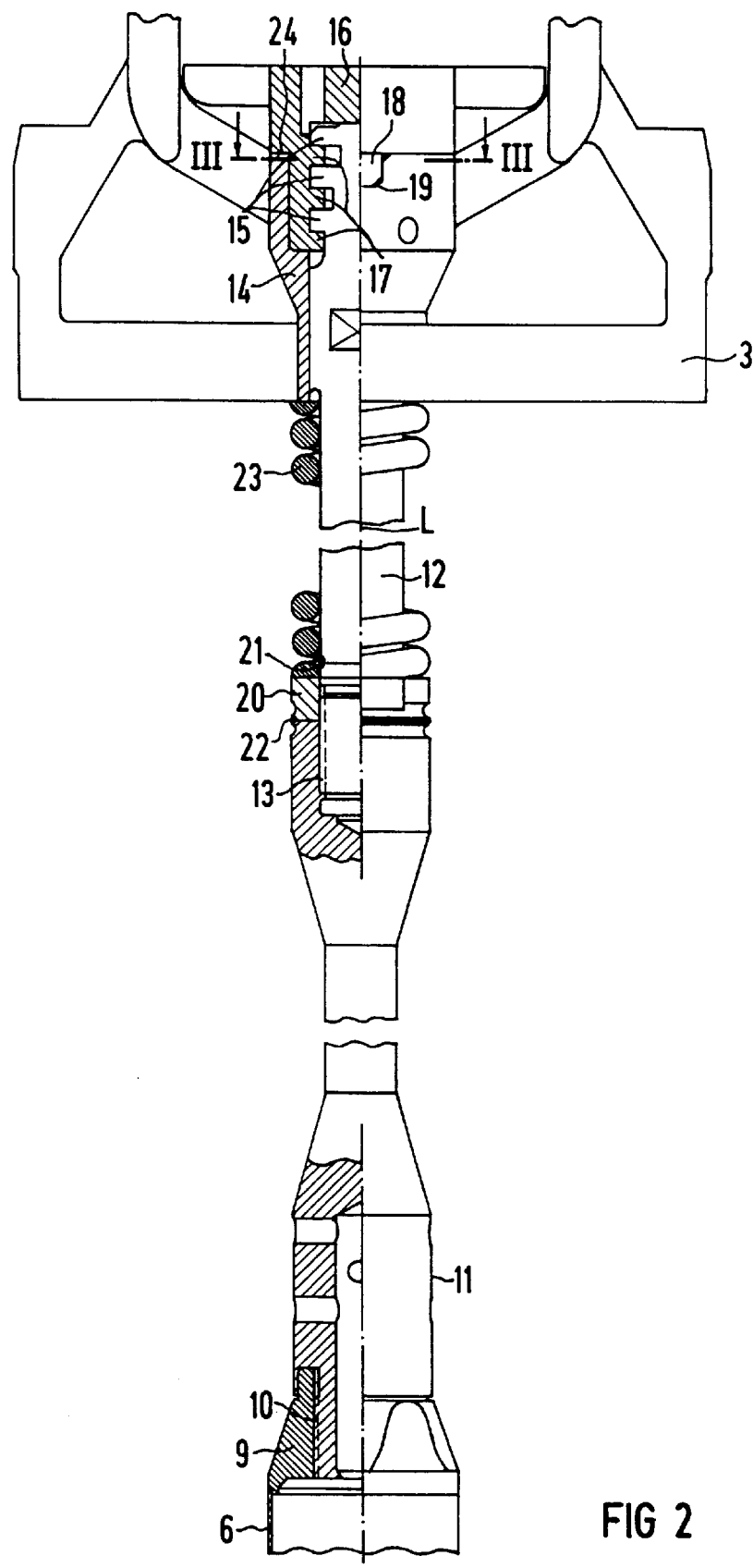
FIG. 2 is an enlarged, fragmentary, side-elevational and partially longitudinal-sectional view of an elongated extension body at a water tube of the nuclear reactor fuel assembly of FIG. 1.

As is shown particularly clearly in FIG. 2, an end cap 9 has been inserted into a second upper end of the water tube 6 and is welded to the water tube 6. This end cap 9 has a lead-through 10 which is coaxial with the water tube 6. One partial body 12 and another partial body 11 are also seen in FIG. 2. The other partial body 11 which has outlet conduits for water from the water tube 6, has a lower first end that is screwed into the lead-through 10. The other partial body 11 forms an elongated extension body at the upper end of the water tube 6, together with the one partial body 12 which is coaxial with the other partial body 11 and the water tube 6. The one partial body 12, which is coaxial with the other partial body 11, has a lower second end 13 which is screwed into an upper second end of the other partial body 11, and an upper second end of the one partial body 12 engages a lower end of a sleeve 14 in the fuel assembly head 3. Seen as a whole, the first or lower end of the elongated extension body 11, 12 is screwed into the second end of the water tube 6 or the second end of the water tube 6 is screwed into the first or lower end of the elongated extension body 11, 12. The second or upper end of the elongated extension body 11, 12 grips and is held at the fuel assembly head 3.

On the exterior of the jacket, the upper second end of the one partial body 12 has three pairs of radially directed tongues 15, which are spaced apart from each other in the longitudinal direction of the one partial body 12. As is seen in the cross section according to FIG. 3 along with FIG. 2, the two tongues 15 of each pair are formed by legs of two vertical and opposite angles a with respect to a penetration point S of a longitudinal axis L of the one partial body 12. The vertical and opposite angles α have the same value for all of the pairs of tongues 15 and are less than 90°. All three of the pairs of tongues 15 are furthermore in alignment with each other, so that these tongues 15 are rotationally oriented in relation to the longitudinal axis L of the one partial body 12.

A retaining sleeve 16 is inserted into the upper end of the sleeve 14 and is coaxial with the one partial body 12 and rotatable around its longitudinal axis inside the sleeve 14 to form a bayonet connection between the one partial body 12 and the fuel assembly head 3. In addition, the retaining sleeve 16 has a shoulder 24 on its exterior on the jacket, with which this retaining sleeve 16 is supported on an edge of the upper end of the sleeve 14. On the inside of the jacket, the retaining sleeve 16 has three pairs of tongues 17 which are spaced apart from each other in the direction of the longitudinal axis of the retaining sleeve 16 and thus of the one partial body 12. These pairs of tongues 17 are also defined by the legs of the two vertical and opposite angles α which are of the same size as the vertical and opposite angles α limiting the tongues 15. The pairs of tongues 17 in the retaining sleeve 16 are also in alignment, when viewed in the direction of the longitudinal axis of the retaining sleeve 16. Furthermore, these tongues 17 of the retaining sleeve 16 grip the tongues 15 on the one partial body 12 from behind, if two protrusions 18, which are disposed on the exterior of the jacket of the retaining sleeve 16 in a diameter of this retaining sleeve 16, have each engaged a groove 19 in the edge on the upper end of the sleeve 14. Both grooves 19 are also located on a diameter of the sleeve 14.

A thread is located on the end of the one partial body 12 that is screwed into the other partial body 11. An optional check or counter nut 20 is seated on the thread and braced against the other partial body 11. The optional check nut 20 may be welded to the one partial body 12 by a hollow weld 21 in order to secure it against rotation, and a thread in the check nut 20 and the associated thread on the one partial body 12 are disposed at a distance from the weld 21. The check nut 20 is welded to the other partial body 11 by a lip weld or V-weld 22.

Furthermore, a helical spring 23, which is coaxial with the one partial body 12 and is placed under pressure, is seated on the outside of the one partial body 12 and is supported at one end on the check nut 20 and at the other end on the fuel assembly head 3 and in this way presses the protrusions 18 on the outside of the retaining sleeve 16 into the grooves 19 at the edge of the upper end of the sleeve 14.

The one partial body 12, which is screwed into the other partial body 11 and on which the helical spring 23 and the check nut 20 are already seated, is aligned with respect to the water tube 6 which has a square cross section. Then the check nut 20 is braced against the other partial body 11 and is welded to the one partial body 12 and the other partial body 11. Following this, the fuel assembly head 3 is pushed on the one partial body 12 so that one end of the fuel rods 4 engage the inside of the fuel assembly head 3. The retaining sleeve 16 is then placed on the upper end of the one partial body 12. Since the tongues 15 on the exterior of the upper end of the one partial body 12 are rotationally oriented, the tongues 17 on the interior of the jacket of the retaining sleeve 16 fit exactly between the tongues 15 on the exterior of the jacket of the one partial body 12. When turning the retaining sleeve 16 by 90 ° about its longitudinal axis, the protrusions 18 on the exterior of the retaining sleeve 16 are locked into the two grooves 19 at the upper end of the sleeve 14, so that the fuel assembly head 3 is fixed on the one partial body 12.

Figure 3:
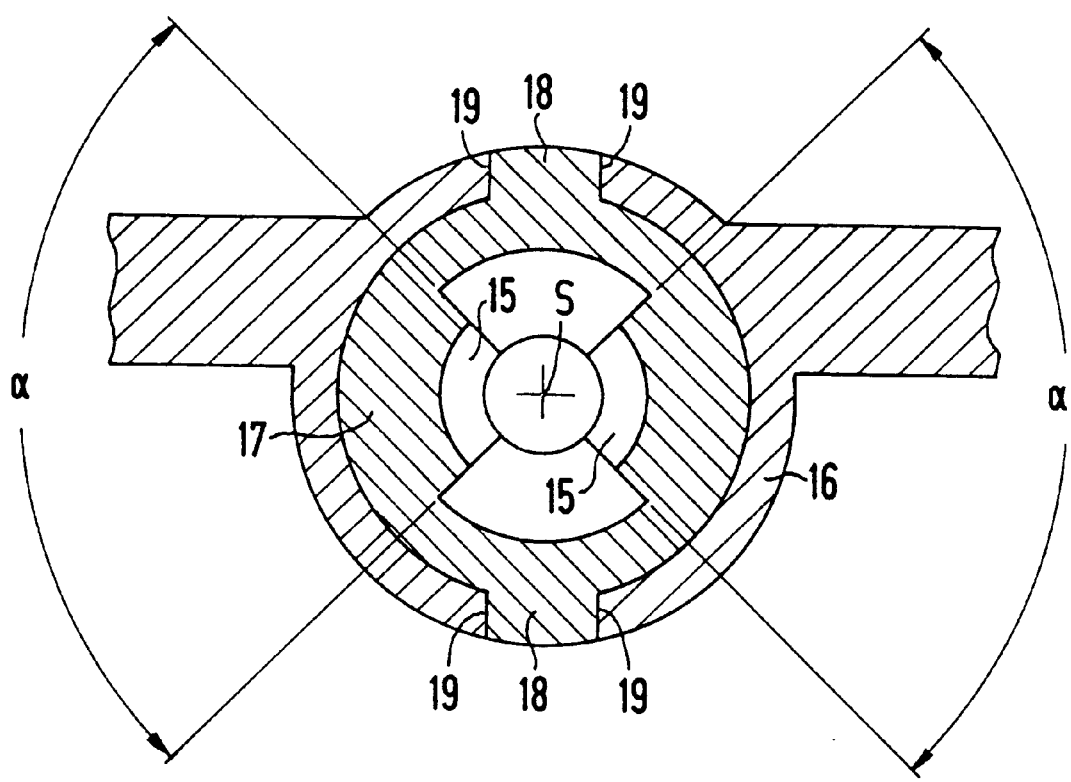
FIG. 3 is a fragmentary, cross-sectional view of a fuel assembly head and an elongated extension body, which is taken along the dot-dash line III—III of FIG. 2, in the direction of the arrows.

In briefly summarizing the structure of FIG. 3, the tongues 17 are attached at the inner jacket surface of the retaining sleeve 16. The retaining sleeve 16 is rotatable about its longitudinal axis while it is inserted into the sleeve 14 of the fuel assembly head 3 and it has projections formed at the outer jacket surface arranged along a diameter of the retaining sleeve 16. The projections 18 are locked in the groove 19 formed at the upper edge of the sleeve 14.

Referring now to FIGS. 4a–4f, which depict a series of assembly steps with the aid of a model of a preferred exemplary embodiment of the invention, there is shown a fuel assembly head with the sleeve 14 and a groove 19 formed at the edge at the upper end at the sleeve 14. The retaining sleeve 16 sits in the sleeve 14. The inside surface of the retaining sleeve 16 is provided with tongues 17 and on the outside jacket there is formed a protrusion 18. That protrusion 18 lies on the upper edge of the sleeve 14, outside of the groove 19.

Figure 4A:
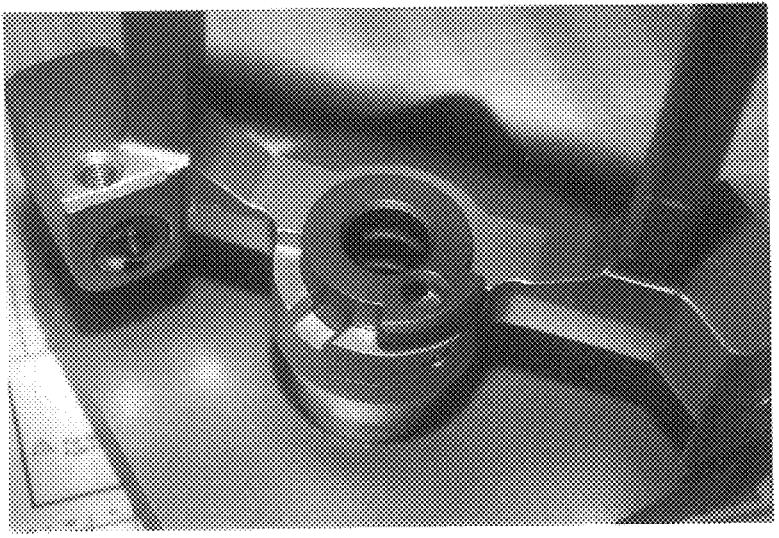
FIGS. 4a–4f are photographic renditions of a model of an embodiment of the invention, showing a series of assembly steps in a perspective view.
Figure 4B:
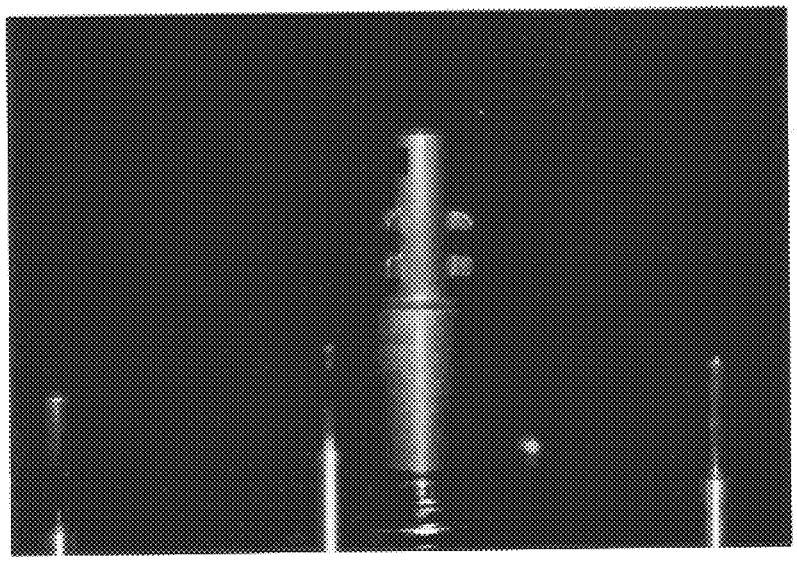

FIG. 4b illustrates the end of the partial body 12 of the extension body, which partial body is to engage in the fuel assembly head 3. The tongues 15 are clearly shown. Also, the upper ends of four fuel rods are shown.

Figure 4C:
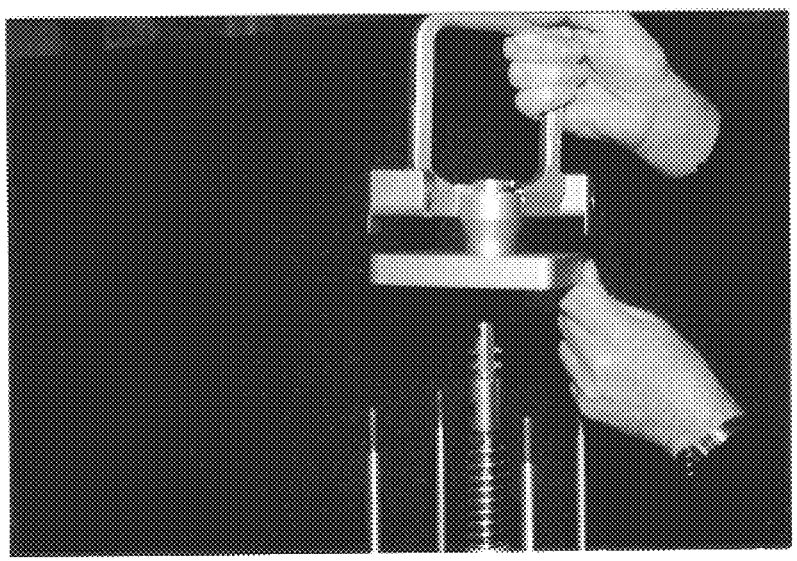

FIG. 4c illustrates how the fuel assembly head of FIG. 1 is placed onto the partial body 12 of the extension body and onto the four upper ends of the fuel rods.

Figure 4D:
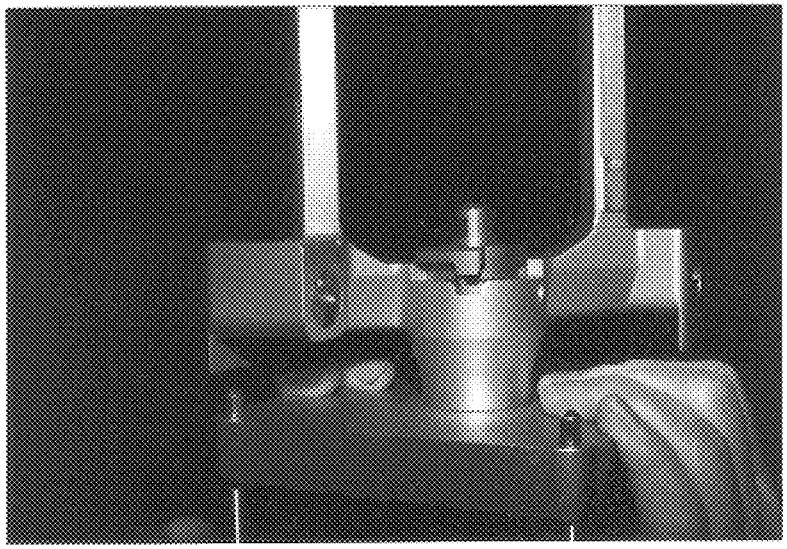

FIG. 4d illustrates how the fuel assembly head placed on the upper end of the partial body 12 of the extension body and onto the fuel rods is pressed against the helical spring shown in FIG. 3. The helical spring is thereby pretensioned.

Figure 4E:
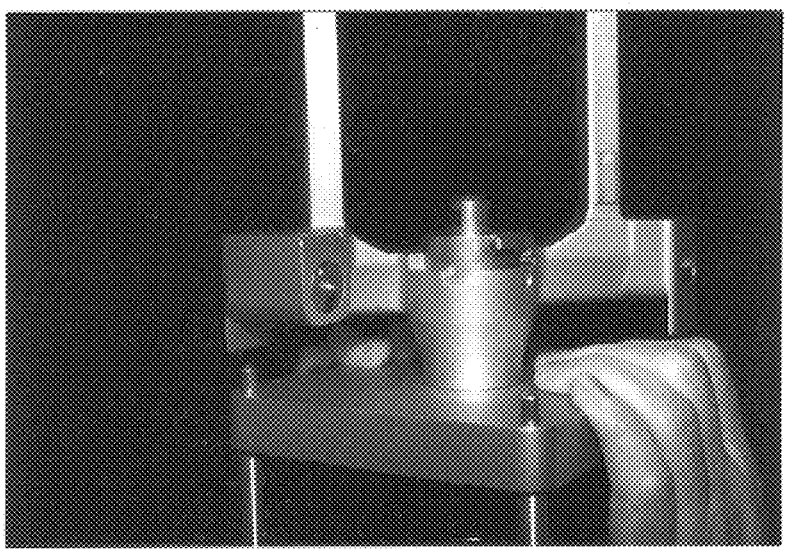

FIG. 4e shows a situation in which the retaining sleeve 16 has been rotated from the position of FIG. 4d. The tongues 17 on the inside of the jacket of the retaining sleeve 16 engage exactly between the tongues 15 on the outer jacket of the partial body 12. Also, the retaining sleeve 16 is positioned such that the projection 18 may engage in the groove 19.

Figure 4F:
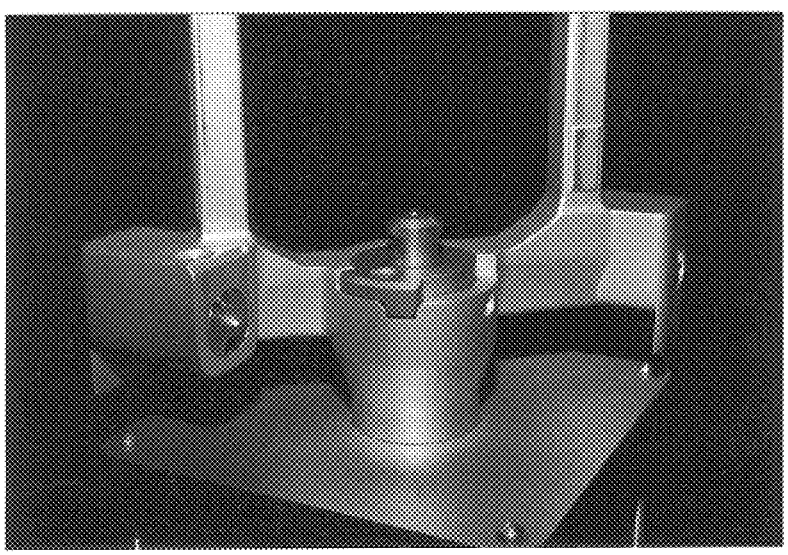

FIG. 4f, finally, shows how the retaining sleeve 16 is locked in the groove 19 of the sleeve 14. In this position, the sleeve 14 is pressed against the retaining sleeve 16 by the biased helical spring. Accordingly, the retaining sleeve 16 can no longer be loosened, unless the fuel assembly head with the sleeve 14 is pressed downwardly against the helical spring (FIG. 3), such that it assumes the position shown in FIG. 4d.

The term "bayonet closure" as recited in the claims may be understood as follows:

The fuel assembly head 3 in FIG. 2 is pushed on the partial body 12 against the helical spring 23 as far as possible in the direction of the water tube 6. Then the retaining sleeve 16 can easily be placed on the end of the partial body 12 with the tongues 15, so that the tongues 17 on the inside of the rotating sleeve 16 fit exactly between the tongues 15 on the outside of the partial body 12. The retaining sleeve 16 is then rotated about its axis by 90°, so that the tongues 17 engage between the tongues 15. At this point, the projections 18 of the retaining sleeve are placed exactly above the grooves 19. If, at that point, the helical spring 23 is allowed to push the partial body 12 away from the water tube 6, the projections 18 engage in the grooves 19 and the step 24 on the outside of the retaining sleeve 16 sits on the upper edge of the sleeve 14. Now the bayonet closure is tightly closed.

We claim:

1. A nuclear reactor fuel assembly, comprising:
    a fuel assembly base;
    a fuel assembly head;
    mutually parallel fuel rods containing nuclear fuel and extending between said fuel assembly head and said fuel assembly base;
    a water tube having first and second open ends and extending parallel to said fuel rods, said first end of said water tube being attached to and supported by said fuel assembly base;
    an elongated extension body having first and second ends, said second end of said extension body gripping and being held at said fuel assembly head;
    said second end of said water tube and said first end of said elongated extension body being attached to each other;
    said elongated extension body having two mutually coaxially disposed partial bodies, one of said partial bodies having said second end of said extension body gripping said fuel assembly head and the other of said partial bodies having said first end of said extension body being attached to said water tube, one of said partial bodies being screwed into the other of said partial bodies; and
    said second end of said extension body extending loosely through said fuel assembly head and said fuel assembly head being fixed on said second end of said extension body by a bayonet connection.

2. The nuclear reactor fuel assembly according to claim 1, further comprising a check nut seated on said one partial body being screwed into said other partial body, said check nut being braced against said other partial body.

3. The nuclear reactor fuel assembly according to claim 1, wherein said first end of said extension body is screwed into said second end of said water tube.

4. The nuclear reactor fuel assembly according to claim 1, wherein said second end of said water tube is screwed into said first end of said extension body.

5. The nuclear reactor fuel assembly according to claim 1, wherein said first end of said water tube is screwed into said fuel assembly base.

6. The nuclear reactor fuel assembly according to claim 2, further comprising a hollow weld with which said check nut is welded to said one partial body on which said check nut is seated.

7. The nuclear reactor fuel assembly according to claim 6, wherein said check nut and said one partial body have associated threads disposed at a distance from said hollow weld.

8. The nuclear reactor fuel assembly according to claim 2, wherein said check nut is welded to said partial body against which said check nut is braced with a lip or V-weld.

9. A nuclear reactor fuel assembly, comprising:
    a fuel assembly base;
    a fuel assembly head;
    mutually parallel fuel rods containing nuclear fuel and extending between said fuel assembly head and said fuel assembly base;
    a water tube having first and second open ends and extending parallel to said fuel rods, said first end of said water tube being attached to and supported by said fuel assembly base;
    an elongated extension body having first and second ends, said second end of said extension body gripping and being held at said fuel assembly head;
    said second of said water tube and said first end of said elongated extension body being screwed to each other;
    said elongated extension body having two mutually coaxially disposed partial bodies, one of said partial bodies having said second end of said extension body gripping said fuel assembly head and the other of said partial bodies having said first end of said extension body being screwed to said water tube, one of said partial bodies being screwed into the other of said partial bodies;
    said second end of said extension body extending loosely through said fuel assembly head and said fuel assembly head being fixed on said second end of said extension body by a bayonet connection;

said bayonet connection being defined by first tongues radially formed on an outer jacket surface of said second end of said extension body, and a retaining sleeve being lockable with said fuel assembly head, said retaining sleeve being inserted between said second end of said extension body and said fuel assembly head, and second tongues radially formed on an inner jacket surface of said retaining sleeve for interlocking with said first tongues.

10. The nuclear fuel assembly according to claim 1, wherein the bayonet connection is defined by first tongues radially formed on an outer jacket surface of said second end of said extension body, and including a retaining sleeve being lockable with said fuel assembly head, said retaining sleeve being inserted between said second end of said extension body and said fuel assembly head, and second tongues radially formed on an inner jacket surface of said retaining sleeve for interlocking with said first tongues.

11. The nuclear fuel assembly according to claim 1, wherein said partial bodies have a fixed rotationally oriented position relative to one another.

* * * * *